United States Patent
Park et al.

(10) Patent No.: US 12,313,326 B2
(45) Date of Patent: May 27, 2025

(54) REFRIGERATOR

(71) Applicant: LG ELECTRONICS INC., Seoul (KR)

(72) Inventors: Jongkwon Park, Seoul (KR); Hong Sun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 18/102,399

(22) Filed: Jan. 27, 2023

(65) Prior Publication Data

US 2023/0243571 A1 Aug. 3, 2023

(30) Foreign Application Priority Data

Jan. 28, 2022 (KR) .......................... 10-2022-0013690

(51) Int. Cl.
| | |
|---|---|
| *F25D 17/08* | (2006.01) |
| *F21V 33/00* | (2006.01) |
| *F25D 27/00* | (2006.01) |
| *F21Y 115/10* | (2016.01) |

(52) U.S. Cl.
CPC .......... *F25D 17/08* (2013.01); *F21V 33/0024* (2013.01); *F25D 27/00* (2013.01); *F21Y 2115/10* (2016.08)

(58) Field of Classification Search
CPC ...... F21V 33/0024; F25D 27/00; F25D 17/08; G02B 5/10
See application file for complete search history.

(56) References Cited

U.S. PATENT DOCUMENTS

| | | | | |
|---|---|---|---|---|
| 3,398,272 | A * | 8/1968 | Elmer | G02B 5/10 362/296.07 |
| 3,492,474 | A * | 1/1970 | Hishinuma | F21S 41/323 362/350 |
| 5,987,199 | A * | 11/1999 | Zarian | G02B 6/001 362/559 |
| 10,371,437 | B2 * | 8/2019 | Weber | F25D 11/00 |
| 11,530,865 | B2 | 12/2022 | Hong et al. | |
| 2010/0302804 | A1 * | 12/2010 | Inagaki | G02B 6/0088 362/606 |
| 2015/0247634 | A1 * | 9/2015 | Becke | F25D 27/00 362/555 |
| 2019/0316837 | A1 * | 10/2019 | Weber | G02B 6/0083 |
| 2020/0326116 | A1 * | 10/2020 | Hong | F25D 23/061 |

FOREIGN PATENT DOCUMENTS

| | | |
|---|---|---|
| KR | 10-1999-0072299 | 9/1999 |
| KR | 10-2007-0010547 | 1/2007 |
| KR | 10-2020-0121110 | 10/2020 |
| KR | 10-2021-0053173 | 5/2021 |

* cited by examiner

*Primary Examiner* — Evan P Dzierzynski
*Assistant Examiner* — Nathaniel J Lee
(74) *Attorney, Agent, or Firm* — KED & ASSOCIATES, LLP

(57) ABSTRACT

A refrigerator incudes a refrigerating case constituting a refrigerator compartment; and a refrigerator compartment cold air supply duct disposed in a rear surface of the refrigerating case, spaced apart from one lateral surface and the other lateral surface of the refrigerating case. The refrigerator compartment cold air supply duct may include a pair of lighting units disposed along both sides of the rear surface, and the pair of lighting units may be disposed to face the lateral surface and the other lateral surface of the refrigerating case, respectively.

19 Claims, 16 Drawing Sheets

REFRIGERATOR

CROSS-REFERENCE TO RELATED APPLICATION(S)

This application claims priority to and the benefit of Korean Patent Application No. 10-2022-0013690, filed in Korea on Jan. 28, 2022, the disclosure of which is incorporated herein by reference in its entirety.

BACKGROUND

1. Field

The present disclosure relates to a refrigerator, more particularly, a refrigerator that may indirectly illuminate from a rear surface thereof.

2. Background

A refrigerator is a home appliance configured to supply cold air generated by refrigerant circulation to a storage chamber (e.g., a refrigerator compartment or a freezer compartment) to keep various kinds of storage targets fresh for a long time in the storage chamber. A refrigerator compartment refrigerates the storing targets and the freezer compartment freezes the storing target. Due to this structure, the amount of supplied cold air needs to be adjusted differently so that the refrigerator compartment and the freezer compartment may maintain different temperatures.

Meanwhile, lighting is installed in the refrigerator compartment so that a user can clearly check the foods stored inside when opening a door. However, conventional lighting has some disadvantages of glare and deteriorated aesthetics because the user directly recognizes the lighting.

BRIEF DESCRIPTION OF THE DRAWINGS

The embodiments will be described in detail with reference to the following drawings in which like reference numerals refer to like elements wherein.

DETAILED DESCRIPTION

Figure 1:
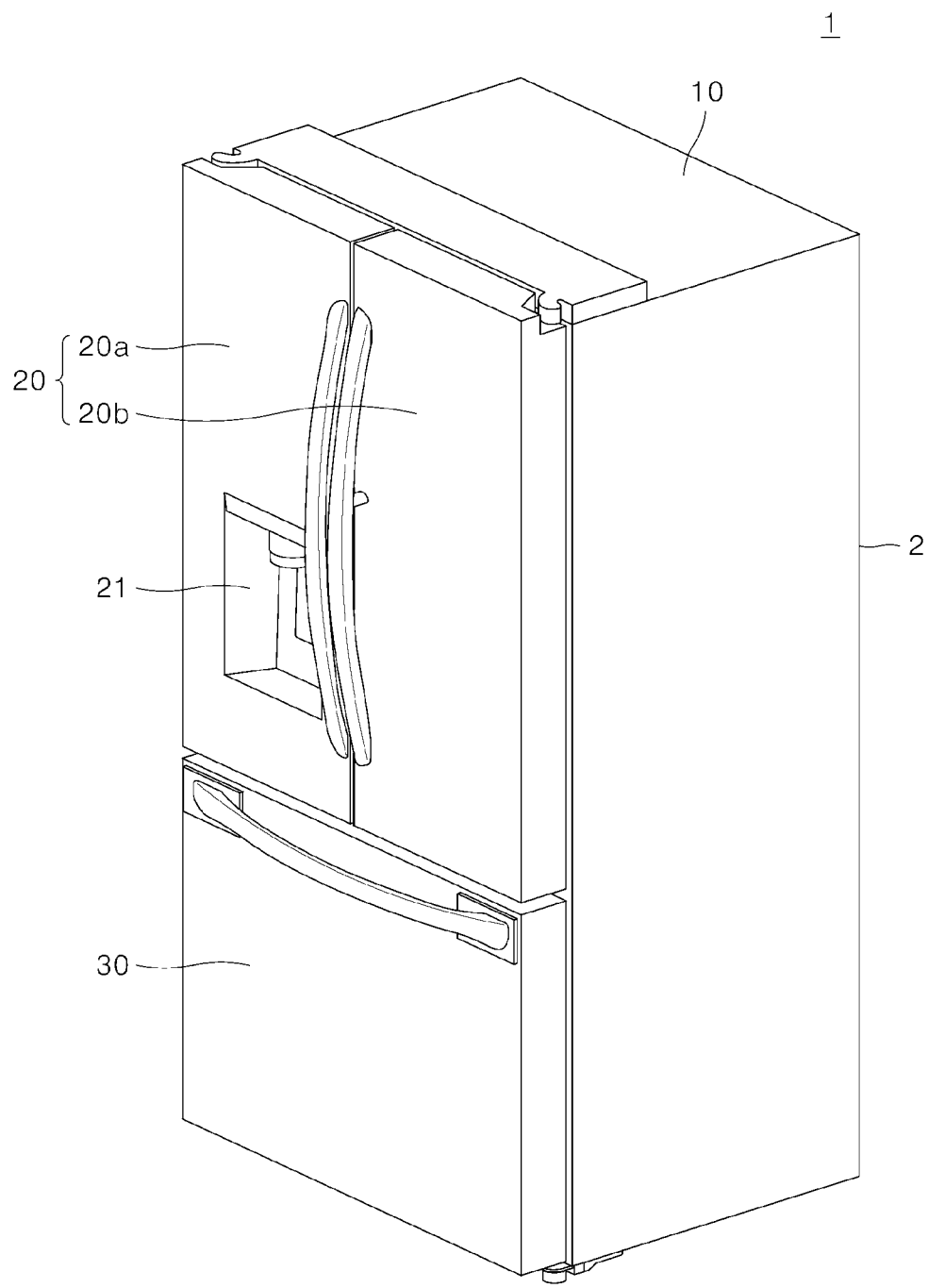
FIG. 1 is a front perspective view showing a state where a door of a refrigerator including an ice-making chamber is closed.

The below-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary. Throughout the disclosure, each component can be provided as a single one or a plurality of ones, unless explicitly stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. Throughout the disclosure, the terms "A and/or B" as used herein can denote A, B or A and B, and the terms "C to D" can denote C or greater and D or less, unless stated to the contrary.

Figure 2:
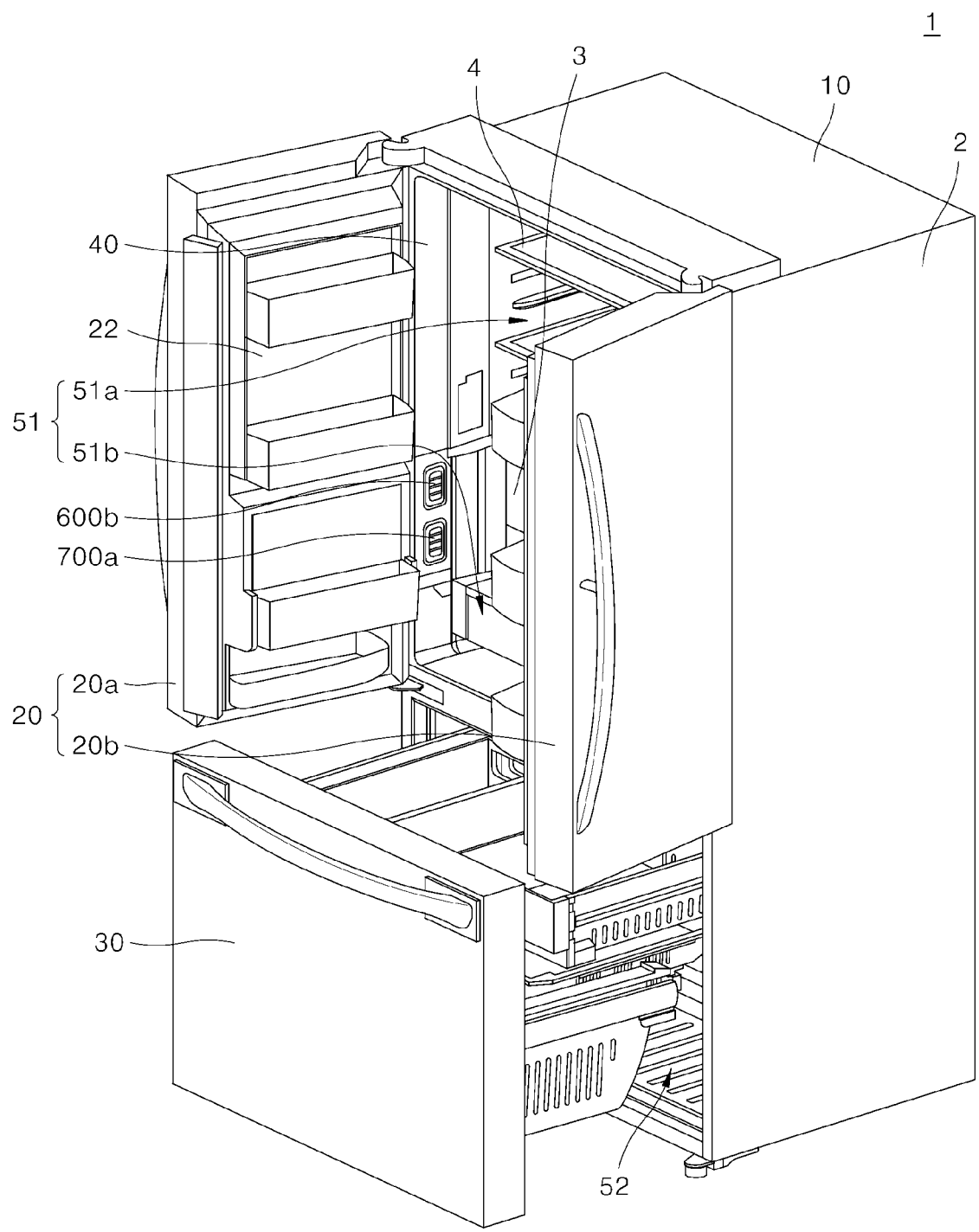
FIG. 2 is a front perspective view showing a state where a door of a refrigerator is open.
Figure 3:
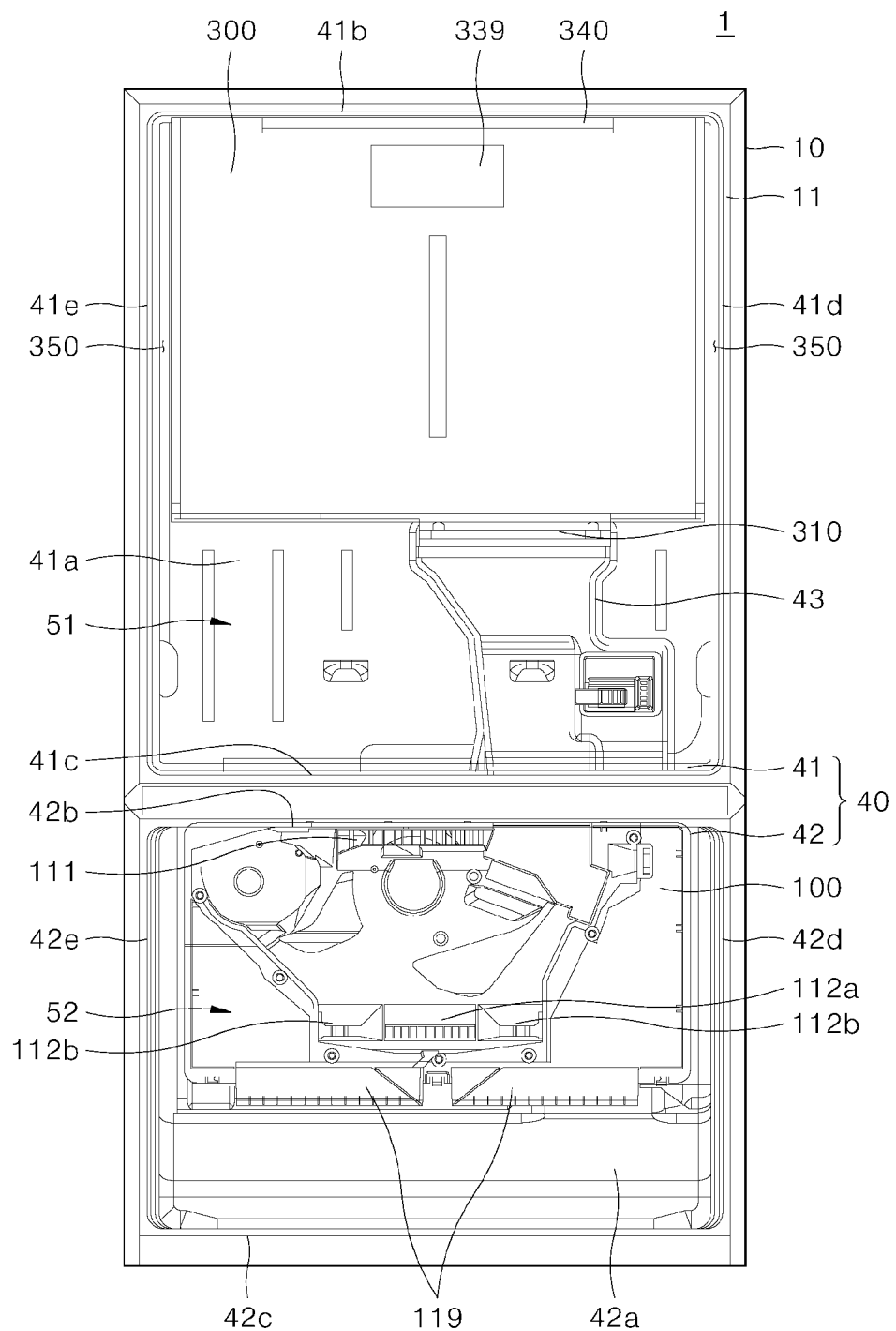
FIG. 3 is a front view of a refrigerator including a grill fan assembly and a refrigerator compartment cold air supply duct.

Hereinafter, a refrigerator according to several embodiments will be described. Referring to FIGS. 1 to 3, an overall structure of a refrigerator will be described.

An exterior design of the refrigerator 1 may be defined by a cabinet 1 defining a storage space and a door configured to open and close an open front of the cabinet 2. The cabinet 2 may include an outer case 10 forming an outer surface of the refrigerator 1 and an inner case 40 forming an inner surface of the outer case 10. The outer case 10 and the inner case 40 may be spaced a preset distance apart from each other and an insulating material is foamed in the space between them to fill the empty space with the insulating material.

A storage space inside the cabinet 2 may be divided into a plurality of spaces, which are a refrigerator compartment 51 and a freezer compartment 52. As one embodiment of the present disclosure, the freezer compartment 52 may be mounted in a lower space of the cabinet 2 and the refrigerator compartment 51 may be mounted in an upper space.

A door may be coupled to a front surface of the cabinet 2 to open and close the refrigerator 1. An upper door 20 may be coupled to a front surface corresponding to the refrigerator compartment 51 and a lower door 30 may be coupled to a front surface corresponding to the freezer compartment 52.

For example, the upper door 20 may be a rotation type configured of a first upper door 20 and a second upper door 20b that are rotatable on shafts on both sides of the cabinet 2, respectively. The lower door 30 may be a drawer type configured to slide inward or outward along a rail.

A dispenser 21 may be disposed in the first upper door 20a and configured to discharge water or ice even when the door is not opened. An ice-making chamber 22 may be disposed in the first upper door 20a in which the dispenser 21 is provided, and may be configured to make ice.

On an inner surface of the inner case 40 connected to the first upper door 20a may be formed an ice-making chamber cold air supply outlet hole 600b for supply cold air to the ice-making chamber 22 and an ice-making cold air returning inlet hole 700a for returning cold air from the ice-making chamber 22. The ice-making chamber cold air supply outlet hole 600b and the ice-making cold air returning inlet hole 700a may be in communication with one surface of the ice-making chamber 22, in a state where the first upper door 20a is closed.

The refrigerator compartment 51 may be divided into a first storage chamber 51a and a second storage chamber 51b. The second storage chamber 51b may be a pantry room that may control the temperature to accommodate a specific storage target such as vegetables or meat.

The first storage chamber 51a may refer the other space of the refrigerator compartment 51, except the second storage chamber 51b, and may be a main storage space. For example, the second storage chamber 51b may be disposed below the first storage chamber 51a, and may be partitioned off as a separate space from the first storage chamber 51a by a partitioning member.

A storage drawer 3 may be provided in the second storage chamber 51b and configured to slide outward and inward along a rail. In addition, a storage drawer 3 or a shelf 4 may be provided in the first storage chamber 51a to easily keep or preserve fresh storing targets.

Separate temperature sensors may be provided in the first storage chamber 51a and the second storage chamber 51b, respectively, and configured to independently adjust and keep different temperatures. The inner case 40 may include a refrigerating case 41 disposed in an upper area and constituting the refrigerator compartment 51, and a freezing case 42 disposed in a lower area and constituting the freezer compartment 52.

The refrigerating case 41 may have a box shape having an open front surface, and a rear surface 41a, an upper surface 41b, a lower surface 41c, a lateral surface 41d and the other lateral surface 42e that are closed. The freezing case 42 may also have a box shape having an open front surface, and a rear surface 42a, an upper surface 42b, a lower surface 42c, a lateral surface 42d and the other lateral surface 42e that are closed.

A grill fan assembly 100 configured to blow the cold air generated by the evaporator 101 may be disposed in a rear surface 42a of the freezing case 42. The grill fan assembly 100 may include a grill fan upper region outlet hole 111 and a grill fan lower region outlet hole 112a and 112b, in order to supply the cold air generated and supplied from the evaporator to the refrigerator compartment 51 through the cold air supply duct 300.

The grill assembly 100 may be configured to supply the cold air generated by the evaporator to the refrigerator compartment 51 through the refrigerator compartment cold air supply duct 300 provided in the rear surface 41a of the refrigerating case 41. An additional connection duct may be provided to facilitate communication between the grill fan assembly 100 and the refrigerator compartment cold air supply duct 300.

The connection duct may have one end connected to the grill fan assembly 100 and the other end connected to the refrigerator compartment cold air supply duct 300, in order to guide the cold air to the refrigerator compartment cold air supply duct 300. The connection duct may be embedded in the insulating material 11 foamed in the space between the outer case 10 and the inner case 40 so that it may be invisible to the user from the front surface of the refrigerator 1. Accordingly, the connection duct may protrude from the lower surface 41c to the upper surface 41b of the refrigerating case 41 to be embedded in a rear surface of a rear projected portion 43 forwardly projected from the rear surface.

A refrigerator compartment cold air supply connection 310 may be extended downward from a lower surface of the refrigerator compartment cold air supply duct 300. A refrigerator compartment cold air main outlet hole 340 may be formed in an upper area of the refrigerator compartment cold air supply duct 300 and a refrigerator compartment cold air auxiliary outlet guide 339 may be formed in a lower area of the refrigerator compartment cold air main outlet hole 340, in order to supply the cold air blown by the grill fan assembly 100 to the refrigerator compartment 51.

The refrigerator compartment cold air supply duct 300 may be formed in the size and a shape, which correspond to the rear surface 41a of the refrigerating case. However, the refrigerator compartment cold air supply duct 300 may be formed narrower in a left-right direction than the width of the rear surface 41a of the refrigerating case in order to be spaced a preset distance apart from the lateral surface 41d and the other lateral surface 41e of the refrigerating case. Accordingly, the refrigerator cold air supply duct 300 may not become in direct contact with one lateral surface 41d and the other lateral surface 41e of the refrigerating case.

Figure 4:
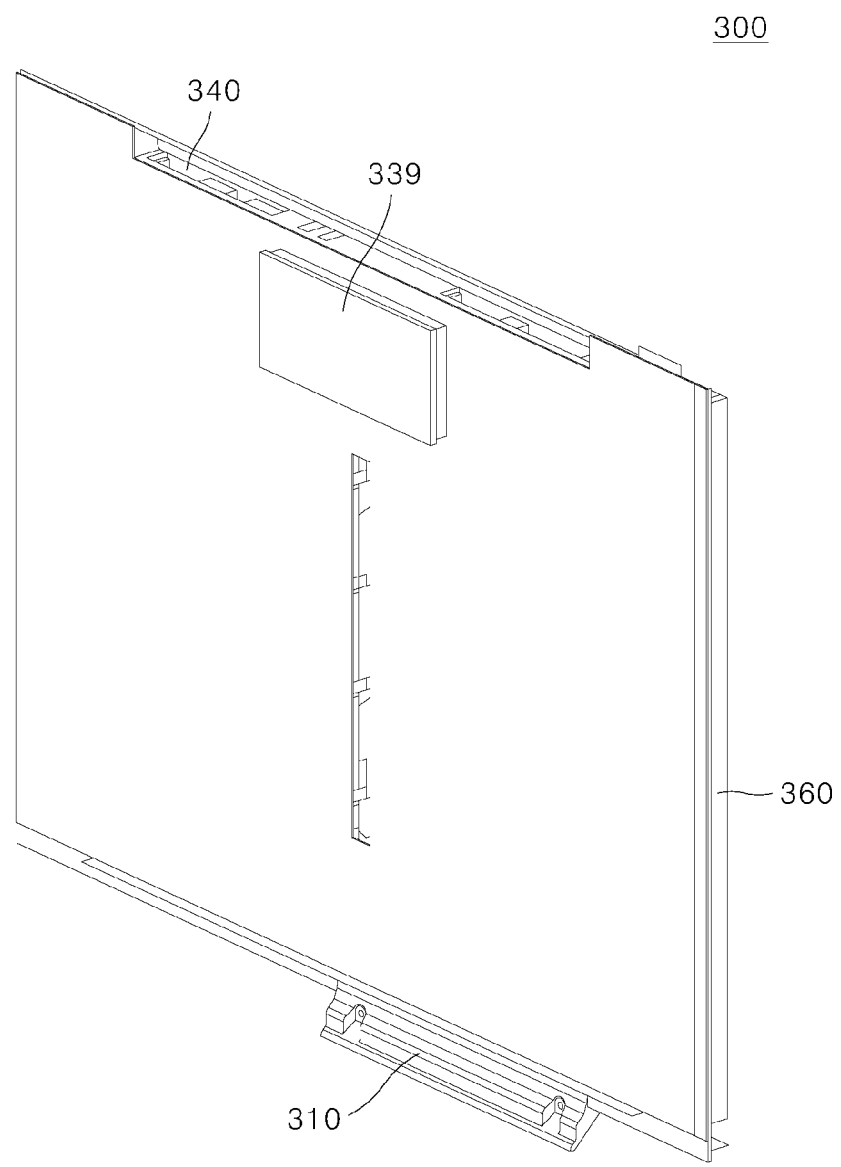
FIG. 4 is a front perspective view of a refrigerator compartment cold air supply duct.
Figure 5:
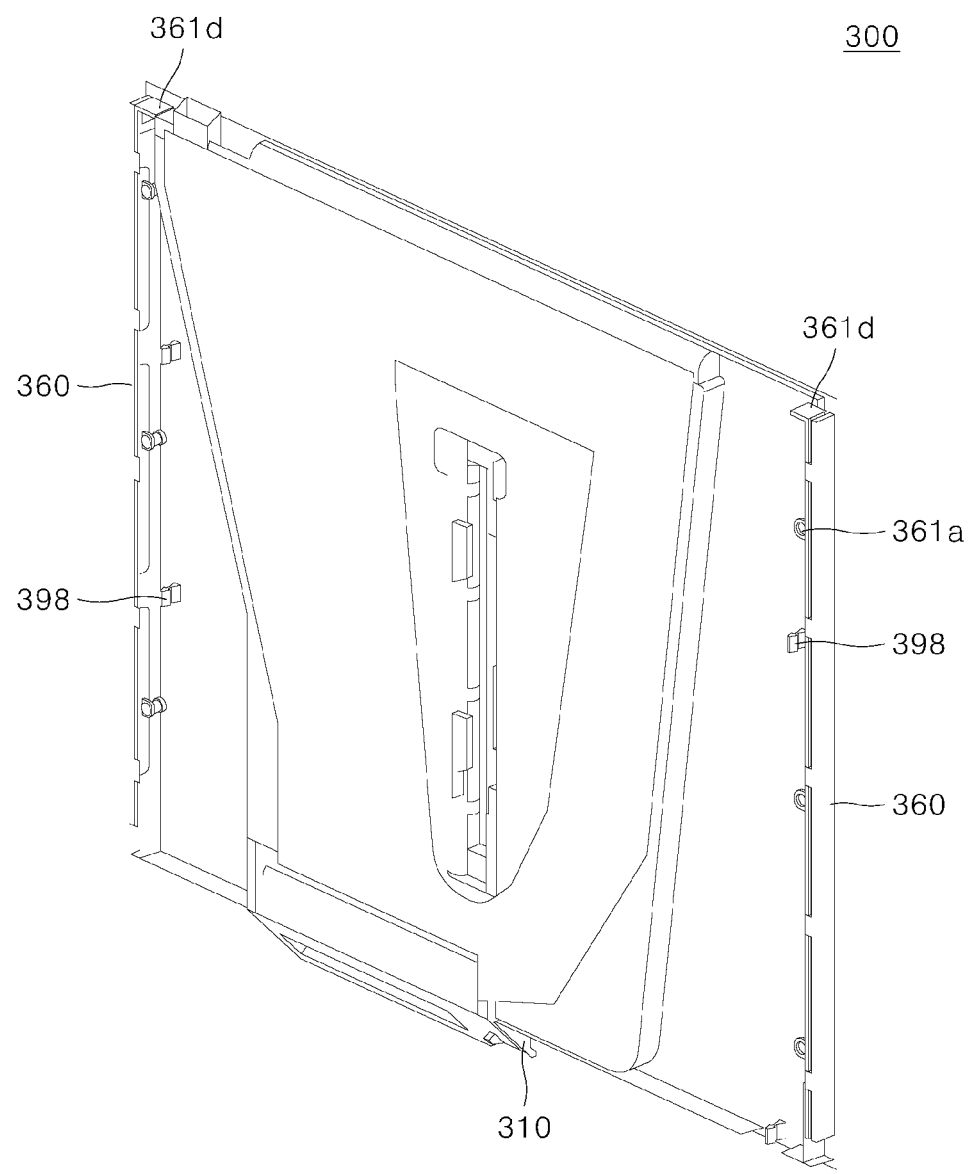
FIG. 5 is a rear perspective view of a refrigerator compartment cold air supply duct.

Hereinafter, referring to FIGS. 4 to 6, the refrigerator compartment cold air duct 300 in which a lighting unit (or lighting assemblies) 360 is disposed will be described in detail. Referring to FIGS. 4 and 5, a pair of lighting units 360 may be disposed along both sides of a rear surface of the refrigerator compartment cold air supply duct 300. In other words, the pair of lighting units 360 may be disposed on the rear surface of the refrigerator compartment cold air supply duct 300 along a longitudinal direction.

The pair of lighting units 360 may be disposed to face one lateral surface 41d and the other lateral surface 41e of the refrigerating case to irradiate light toward the lateral surfaces 41d and 41e of the refrigerating case, respectively. The lighting units 360 are disposed in the rear surface of the refrigerator compartment cold air supply duct 300, so that they may not be seen by the user directly even when the user opens the door. Accordingly, it is possible to reduce the user's feeling of glare.

The light irradiated from the lighting unit 360 may gently spread forwardly along a lateral surface of the refrigerator compartment 51 through the space 350 formed between one lateral surface 41d, the other lateral surface 41e of the refrigerating case. Accordingly, it is possible to implement indirect lighting such as a mood light.

In addition, the light of the lighting unit 360 may be indirectly emitted from the rear surface 41a of the refrigerating case along the lateral surface. Accordingly, there is also an effect of visually making the rear of the refrigerator compartment 51 look wider.

A substrate seating portion 361d may be formed in one end of the lighting unit 360 to seat a LED substrate 362 thereon, which will be described later. The lighting unit 360 may be vertically disposed along the lateral surface of the refrigerator compartment cold air supply duct 300, while the substrate seating portion 361d is disposed in an upper area thereof.

Since the cold air in a lower region is relatively more humid than in an upper region inside the inner space of the refrigerator compartment 51, the LED substrate 362 may be positioned in the uppermost region as possible to reduce short-cut failure of the LED substrate 362. Specifically, viewed from the top, the substrate seating portion 361a may be disposed to look covering the LED substrate 362.

That is, the LED substrate 362 may be invisible, viewed from the top. Accordingly, the substrate seating portion 361d may serve as a roof blocking the LED substrate 362 from being implanted on the LED substrate 362 at the top.

Figure 6:
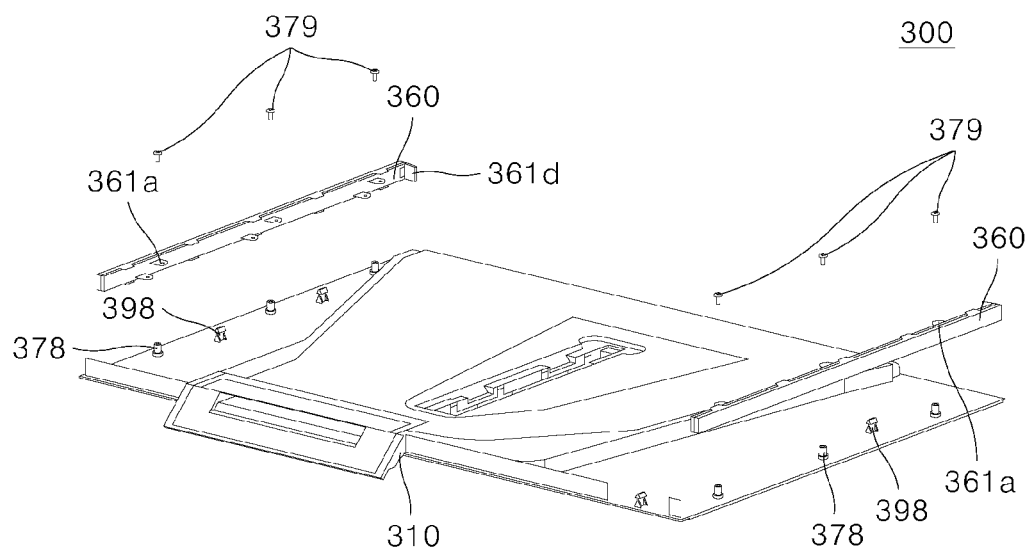
FIG. 6 is an exploded perspective view of a refrigerator compartment cold air supply duct and a lighting unit in a backward direction.
Figure 7:
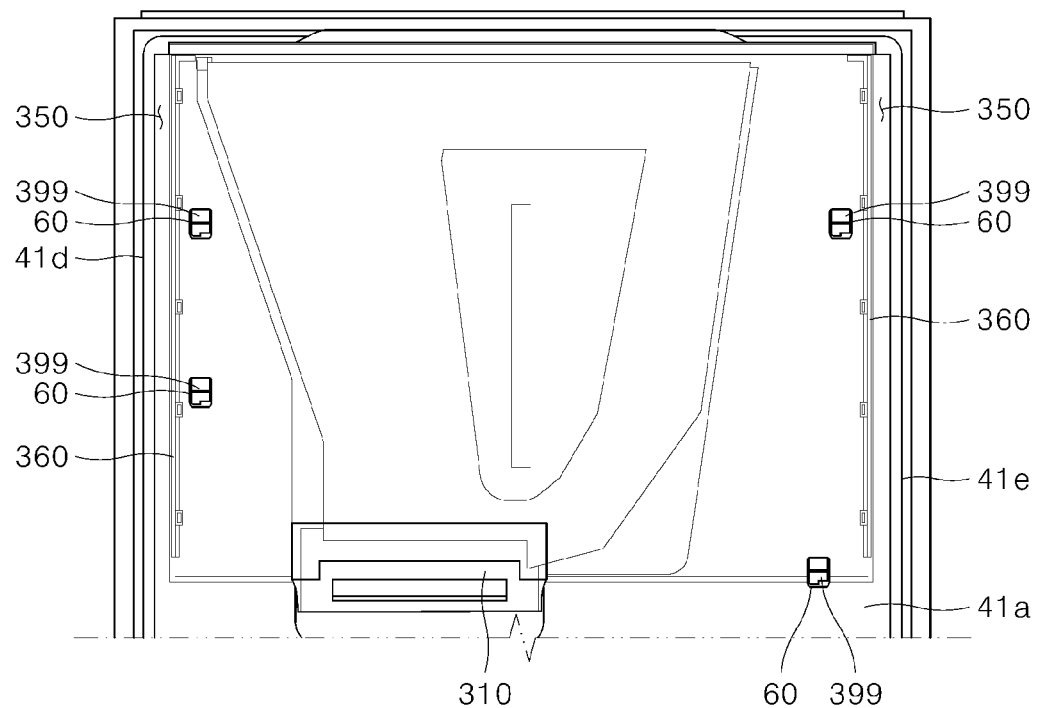
FIG. 7 is a rear perspective view of a refrigerator compartment.
Figure 8:
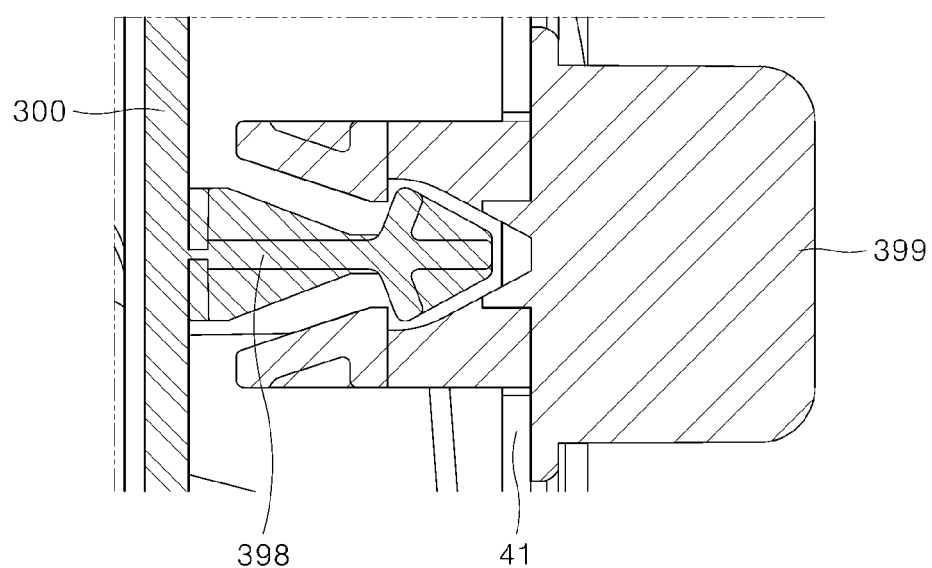
FIG. 8 is a sectional view showing a coupling relation between a securing boss and a fastening bush.
Figure 9:
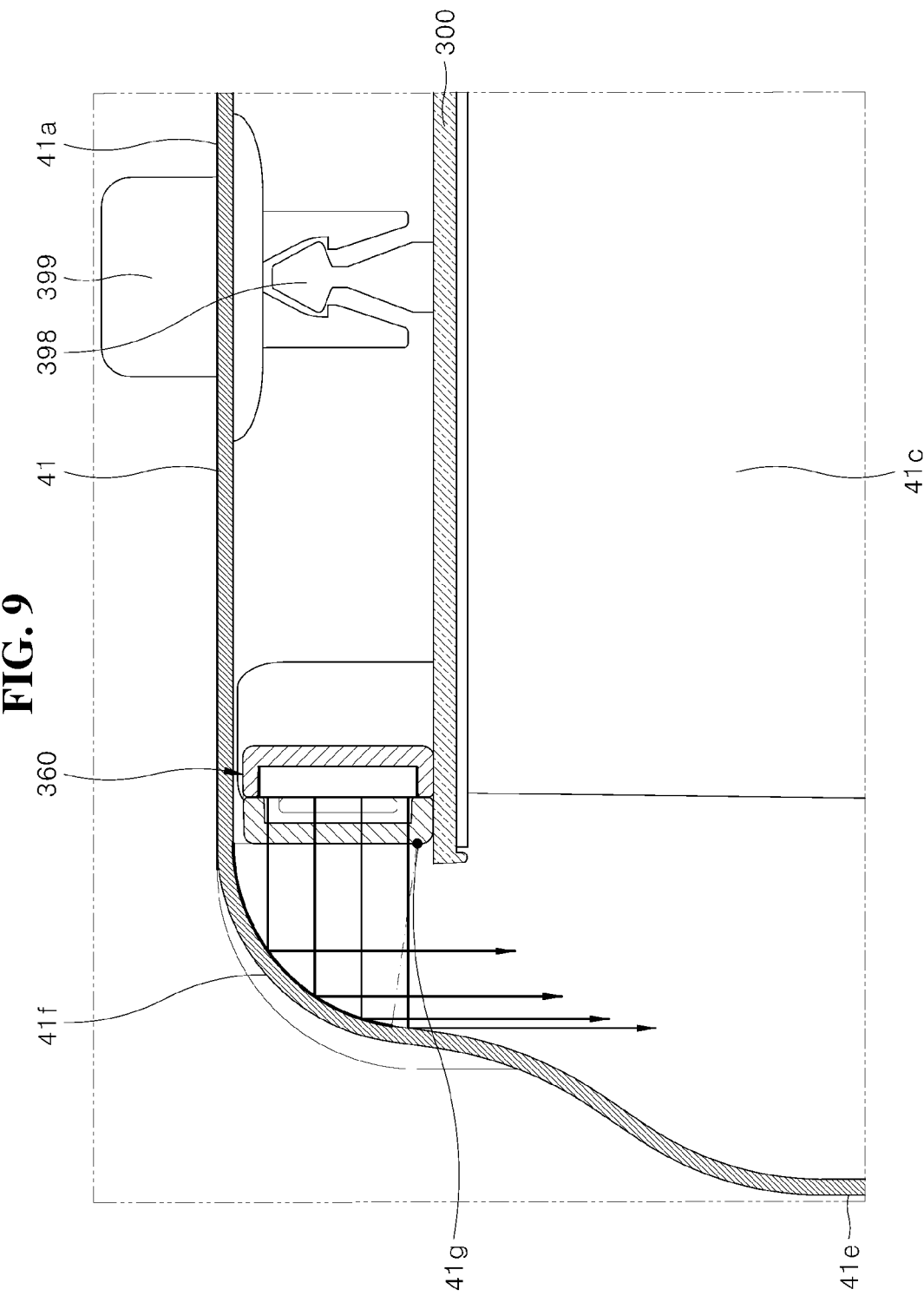
FIG. 9 is a view showing that the light irradiated from the lighting unit is reflected by a curved surface of a refrigerating case.
Figure 10:
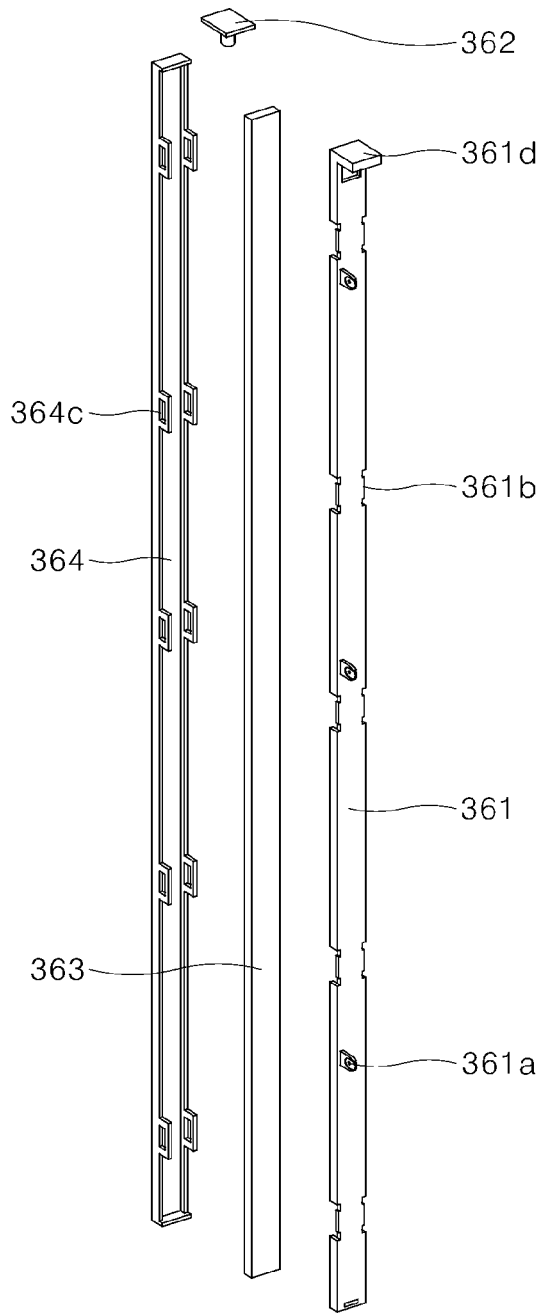
FIG. 10 is an exploded perspective view of components consisting to the light unit.

Referring to FIG. 6, the lighting unit 360 including a fixing hole 361a may be coupled to a lighting unit fixing member 378 formed on a rear surface of the refrigerator compartment cold air supply duct 300. The fixing hole 361a of the lighting unit 360 may be formed at a position corresponding to the lighting unit fixing member 378 disposed in each side of the rear surface of the refrigerator compartment cold air supply duct 300.

Accordingly, the fixing hole 361a of the lighting unit 360 may be fastened to the lighting unit fixing member 378 by using a lighting unit fastening member 379 such as a bolt, so that the lighting unit 360 may be fixed to the rear surface of the refrigerator compartment cold air supply duct 300. Since the lighting unit 360 is disposed along each side of the rear surface of the refrigerator compartment cold air supply duct 300, the lateral surface of the refrigerator compartment cold air supply duct 300 may not be coupled to the lateral surface 41d and the other lateral surface 41e of the refrigerating case 41, in close contact.

Referring to FIGS. 6 to 9, in order to fix the refrigerator compartment cold air supply duct 300 to the rear surface 41a of the refrigerating case 41, a plurality of fixing bosses 398 may be formed on the rear surface of the refrigerator compartment cold air supply duct 300. A fastening through-hole may be formed at a position of the rear surface 41a of the refrigerating case that corresponds to the fixing bosses 398.

An auxiliary fastening bush (or bushing) 399 may be provided on the outside of the refrigerating case 41 to be fastened to the fixing boss 398 through the fastening through-hole 60. For example, the fastening bush 399 may be formed in a shape surrounding the fixing boss 398, and may be coupled to the fixing boss in a sliding method when it is inserted in the fastening bush 399. The fastening may be facilitated by locking a hook of the fastening bush 399 to a protrusion formed in a middle area of the fixing boss 398.

However, the coupling method and shape of the fastening bush 399 and the fixing boss 398 are not limited to the drawings. The coupling method may be changed to a coupling method and a shape in which the user can proceed with the fastening process from the outside of the refrigerating case 41.

Accordingly, the refrigerator compartment cold air supply duct 300 may be fixed to the rear surface 41a of the refrigerating case to have a strong coupling force by coupling the fixing boss 398 to the fastening bush 399. When coupling the refrigerator compartment cold air supply duct 300 to the refrigerating case 41, a worker may easily and quickly perform the coupling process by using only the plurality of fastening bushes 399. Accordingly, assembly workability may be greatly improved.

The lateral surface 41d and the other lateral surface 41e of the refrigerating case 41 which are faced by the pair of lighting units 360, respectively, may be configured of a curved portion 41f. The lighting units 360 may have the light emitting surface that is directed to the lateral surface 41d and the other lateral surface 41e of the refrigerating case 41. In case the lateral surface 41d and the other lateral surface 41e of the refrigerating case 41 have planes perpendicular to the irradiated light, the light cannot be emitted forward.

Accordingly, when the lateral surface 41d and the other lateral surface 41e of the refrigerating case 41 is configured of the curved surfaces 41f. In this instance, the curvature center 41g of the curved surface 41f may overlap with the lighting unit 360. In particular, the curvature center 41g of the curved surface 41f may be preferably located on the outermost surface of the lighting unit 360.

The outermost surface of the lighting unit 360 may be a cover lamp (or cover) 364 or a diffusion plate 365, which will be described later. Unless the curvature center 41g of the curved surface 41f overlaps with the lighting unit 360, the light emitted from the lighting unit 360 may not be properly reflected on the curved portion 41f only to decrease the light traveling forward or the distance between the curved surface 41f and the lighting unit 360 might increase only to reduce the amount of light.

Hereinafter, referring to FIGS. 10 to 14, the lighting unit will be described in detail. The lighting unit 360 may include a case lamp (or lamp case) 361, a LED substrate 362 disposed on one end of the case lamp 361, a light guide plate 363 accommodated in the case lamp 361, and a cover lamp (also referred to herein as a cover or a lamp cover) 364 coupled to the case lamp 361. The LED substrate 362 may include a plurality of LEDs 362a configured to emit light, a connection socket 362b configured to connect a signal and power to the LED substrate, and a terminal 362c configured to drive the plurality of LEDs 362a.

Figure 11A:
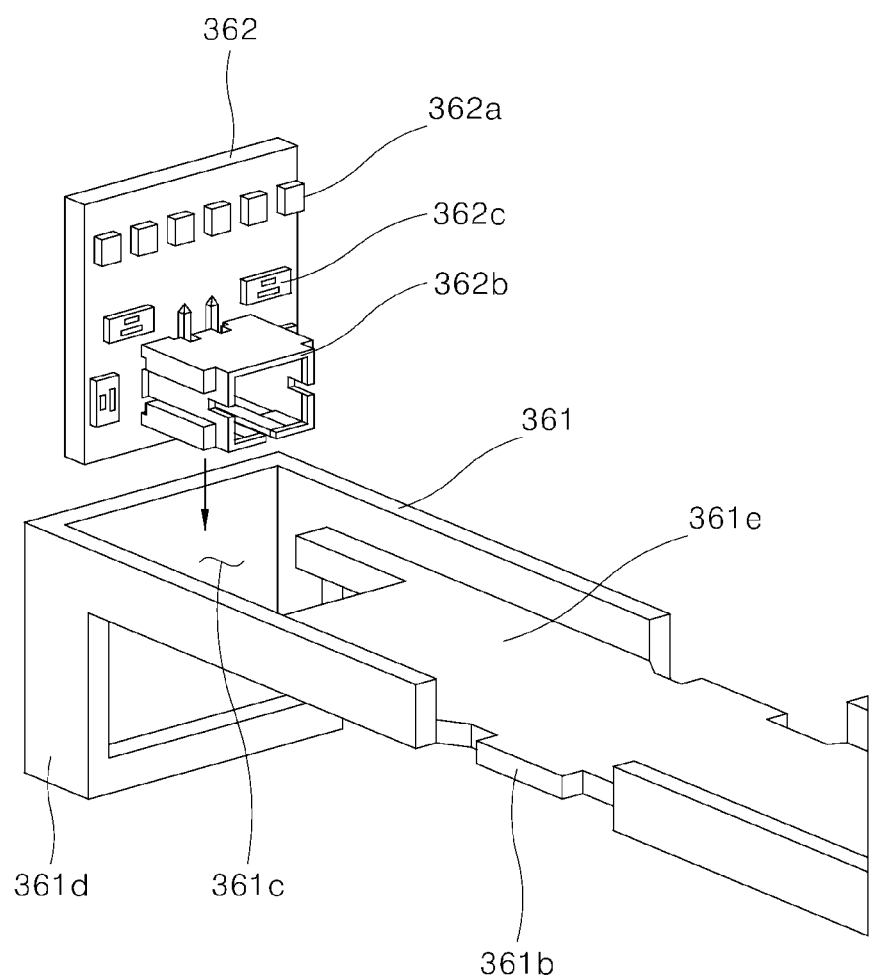
FIG. 11*a* is a perspective view partially showing a state where an LED substrate and a case lamp are coupled to each other.

Referring to FIG. 11a, the LED substrate 362 may be fixedly seated on a substrate seating portion 361d formed in one end of the case lamp 361. In this instance, since the connection socket 362b of the LED substrate 362 has a protrusion shape, an insertion hole 361c sufficient for passing the connection socket 362b therethrough may be formed at one end of a support surface 361e of the case lamp 361. Accordingly, the LED substrate 362 may be seated on the substrate seating portion 361d through the insertion hole 361c of the case lamp 361.

Figure 14:
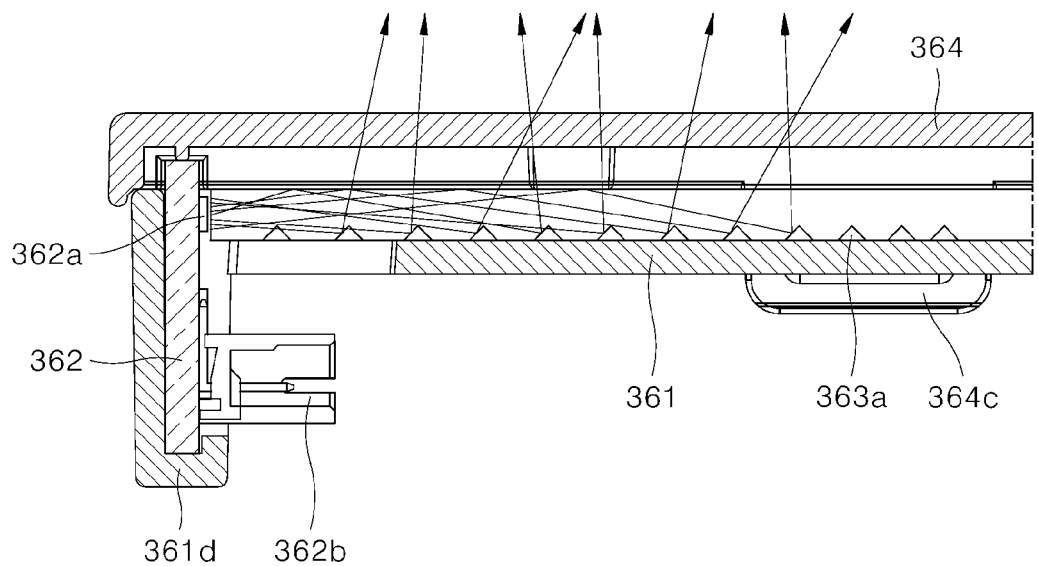
FIG. 14 is a partially sectional view from a direction of a long axis of a lighting unit.

Referring to FIG. 14, the plurality of LEDs 362a may be overlapped to correspond to one surface of the light guide plate 363 disposed to overlap with LED substrate 362. For example, the light guide plate 363 may be formed in a plate shape elongated in a one direction and may include a short part and a long part.

The plurality of LEDs 362a may be formed on one surface in which the short part of the light guide plate 363 is provided so that the light emitted through one surface of the light guide plate 363 may travel far along the long part of the light guide plate 363. Since using the lighting including the light guide plate 363, the light guide plate 363 may emit light over a long distance with uniform brightness even if the amount of LEDs 363a is not large, which results in a significant cost reduction effect.

The light guide plate 363 may have a lower pattern 363a formed in a lower portion to have a predetermined pattern for emit the light farther. In this instance, the density of the lower pattern may be formed to increase more as the distance from the LED substrate 362 increases more, so that light can be uniformly transmitted to a region far from the LED substrate 362.

The light guide plate 363 may further include an upper pattern formed in an upper region. The upper pattern may be extended along the long part that is in a longitudinal direction of the light guide plate 363. Specifically, the upper pattern may be the pattern extended along the vertical direction of the refrigerator compartment 51 to assist the light emitted from one end of the light guide plate 363 to uniformly travel farther.

The light emitted from the LED 362a may be uniformly irradiated to a region corresponding to the light guide plate 363 through the light guide plate 363. The light guide plate 363 may be disposed to face the lateral surface 41d and the other lateral surface 41e of the refrigerating case 41, only to emit light outside as much as possible.

Figure 11B:
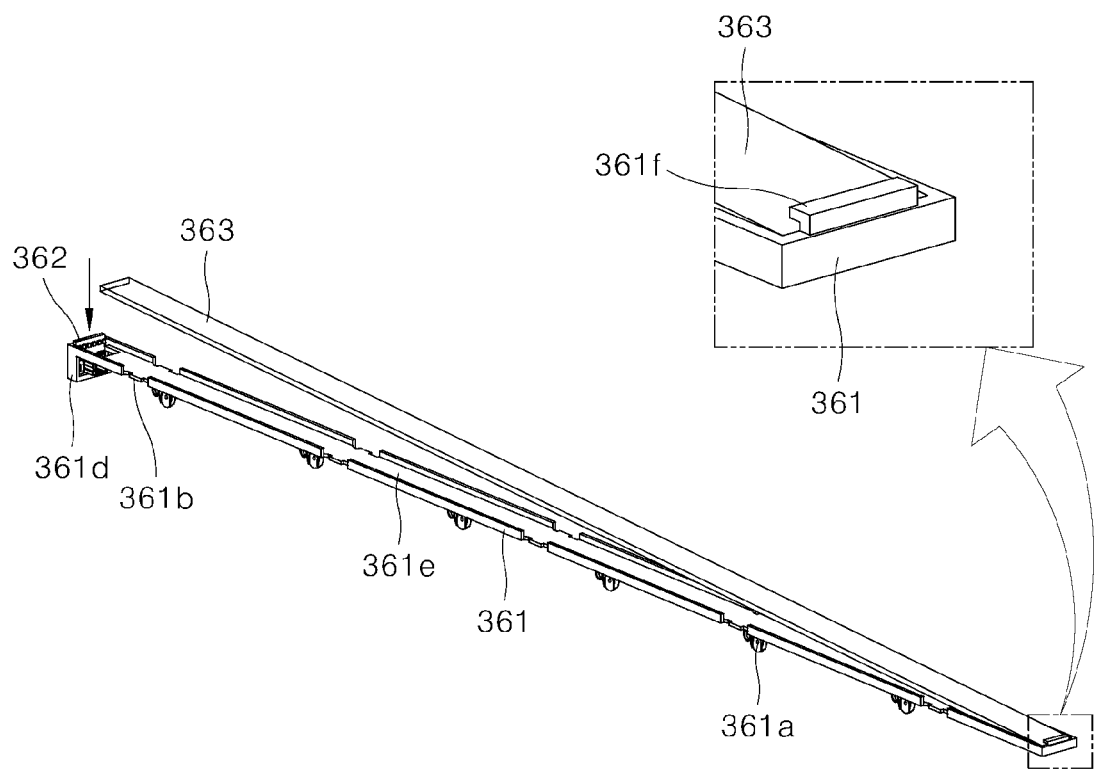
FIG. 11*b* includes a perspective view of a state where a case lamp and a light guide plate are coupled to each other and an enlarged perspective view of a hook projected portion.

Referring to FIG. 11b, a hook protrusion 361f may protrude from the other end of the case lamp 361 toward the inside of the case lamp 361. Accordingly, in order to accommodate the light guide plate 363 in the case lamp 361, the other end of the light guide plate 363 may be inserted in the hook protrusion 361f downward and then insert the other end so that the light guide plate 363 may be fixed to the case lamp 361.

The case lamp 361 may have a lateral surface extended upward and form a lateral wall to define a storage chamber. In addition, a plurality of hooks 361b may protrude outward from the lateral surface of the case lamp 361 to couple the case lamp 361 to the cover lamp 364. Accordingly, the lateral surface of the case lamp 361 in which the plurality of hooks 361b are formed may be the region having no lateral wall. The hook 361b may protrude outward from an extended line of the support surface 361e. A plurality of fixing holes 361a may protrude downward from the lateral surface of the case lamp 361.

Figure 11C:
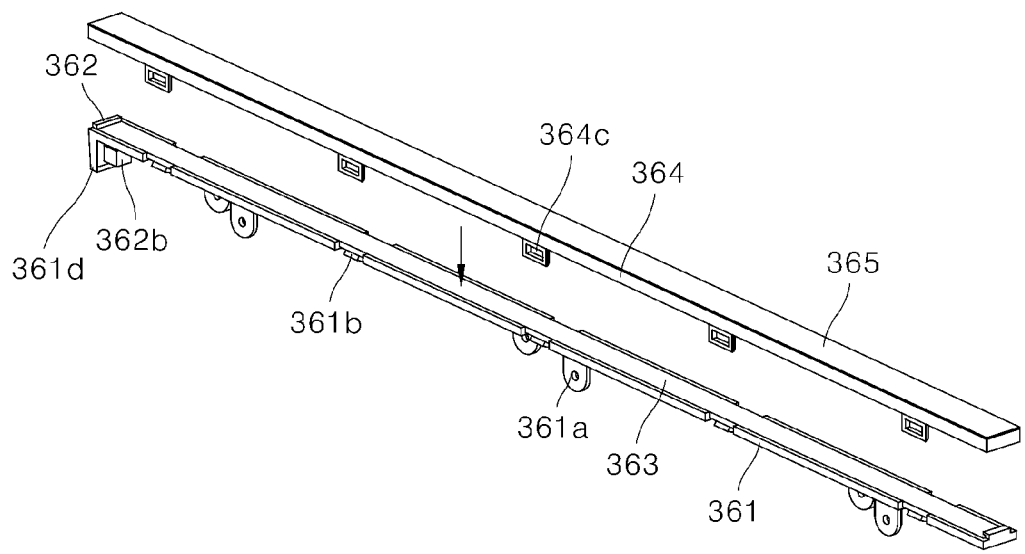
FIG. 11*c* is a perspective view of a state where a case lamp and a cover lamp are coupled to each other.

Referring to FIG. 11c, a cover lamp 364 may be coupled to the case lamp from the top to cover the light guide plate 363. The cover lamp 364 may include a plurality of hook coupling holes 364c extended downward from a lateral surface.

The cover lamp 364 may have a hook coupling hall (or hook coupling recess) 364c formed at a position corresponding to the hook 361b of the case lamp 361 to couple the hook 361b to the hook coupling hall 364c, thereby securing the cover lamp 364 to the case lamp 361. Since the present disclosure chooses the hook coupling structure, a separate fastening member such as a bolt for assembling the components may not be required and the workability of the worker may be greatly improved.

Figure 12:
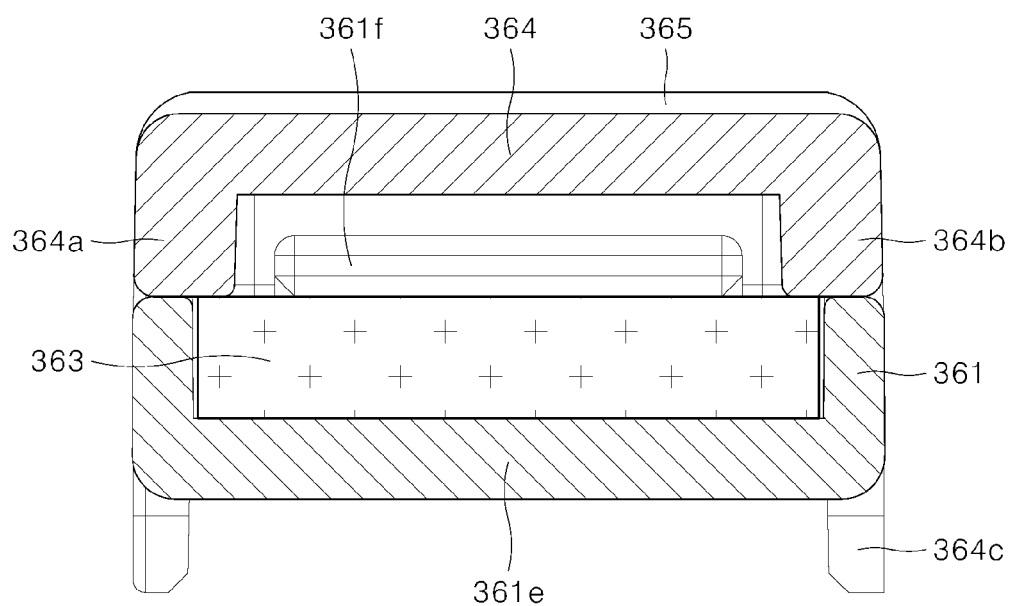
FIG. 12 is a sectional view from a direction of a short axis of a lighting unit.
Figure 13:
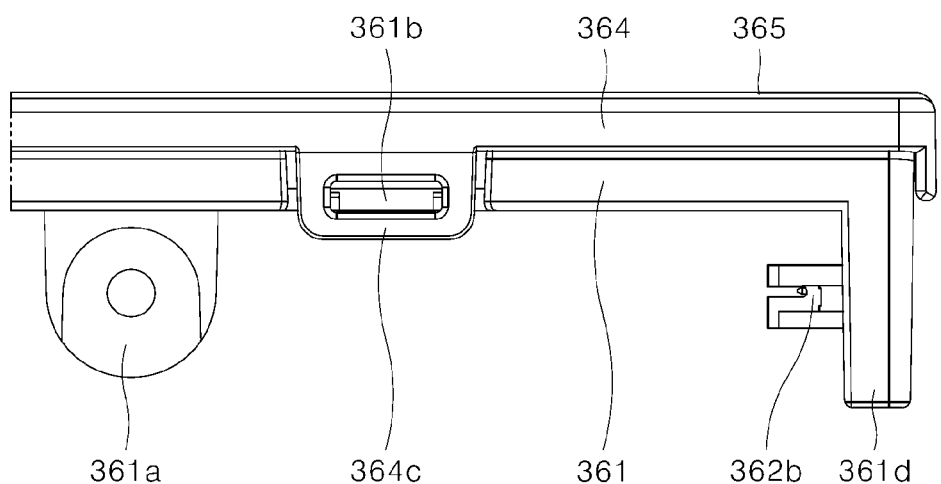
FIG. 13 is a partial side view from a direction of a long axis of a lighting unit.

Referring to FIG. 12, the cover lamp 364 may include a first lateral surface extension 364a and a second lateral surface extension 364b that are extended along both sides in a direction in which the light guide plate 363 is disposed. The first lateral surface extension 364a and the second lateral surface extension 364b may come into contact with an edge of an upper surface of the case lamp 361 and an edge of an upper surface of the light guide plate 363.

Since the cover lamp 364 may be hook-coupled to the case lamp 361, the cover lamp 364 may be in a state of applying a strong downward pressure. Accordingly, the cover lamp 363 in contact with the upper edge of the upper surface of the light guide plate 363 may apply a strong pressure downward to the light guide plate 363, only to fixedly accommodate the light guide plate 363 in the case lamp 361 even without any separate fastening members.

In addition, the cover lamp 364 may be in contact not with the front surface of the light guide plate 363 but only with the edge that can be fixed by applying minimal pressure. Due to this structure, the light emitted from the light guide plate 363 to the outside may be minimized from being disturbed.

To diffuse the light more uniformly, the cover lamp 364 may be formed of a diffusion plate. However, the present disclosure is not limited thereto. As another example, a separate diffusion plate 365 may be formed on the cover lamp 364 to assist the light diffusion.

One aspect of the present disclosure is to provide a refrigerator including a lighting unit configured not to emit light to user's eyes directly. Aspects according to the present disclosure are not limited to the above ones, and other aspects and advantages that are not mentioned above can be clearly understood from the following description and can be more clearly understood from the embodiments set forth herein.

To solve the above-noted objects, in a refrigerator according to an embodiment of the present disclosure, a refrigerator compartment cold air supply duct may include a pair of lighting units disposed along both sides of the rear surface, and the pair of lighting units are disposed to face the lateral surface and the other lateral surface of the refrigerating case, respectively.

Specifically, the pair of lighting units disposed along both sides of a rear surface of the refrigerator compartment cold air supply duct may be spaced a preset distance apart from each other to face one lateral surface and the other lateral surface of the refrigerating case, respectively, thereby indirectly emitting light through the space therebetween.

The refrigerator may include a refrigerating case constituting a refrigerator compartment; and a refrigerator compartment cold air supply duct disposed in a rear surface of the refrigerating case, spaced apart from one lateral surface and the other lateral surface of the refrigerating case, wherein the refrigerator compartment cold air supply duct may include a pair of lighting units disposed along both sides of the rear surface, and the pair of lighting units may be disposed to face the lateral surface and the other lateral surface of the refrigerating case, respectively.

According to the present disclosure, the refrigerator may include the pair of lighting units disposed on the rear surface of the refrigerator compartment cold air supply duct and configured to emit light through the space formed between the lateral surface and the other lateral surface of the refrigerating case. Accordingly, glare may be reduced by preventing the user from being directly irradiated with light, thereby having an effect of providing a soft mood light.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a case defining a storage compartment; and
   a cold air supply duct positioned at a rear surface of the case, and spaced apart from a first lateral surface and a second lateral surface of the case,
   wherein:
      the cold air supply duct includes a pair of lighting assemblies positioned along respective sides of a rear surface of the cold air supply duct,
      the pair of lighting assemblies are configured to output light toward the first and second lateral surfaces of the case, respectively, and
      each of the first and second lateral surfaces of the case has a curved surface, and the curved surface includes regions having different curvatures.

2. The refrigerator of claim 1, wherein a curvature center of the curved surface for each of the first and second lateral surfaces overlaps with a corresponding one of the pair of lighting assemblies.

3. The refrigerator of claim 1, wherein one of the lighting assemblies includes,
   a lamp case;
   a light emitting diode (LED) substrate positioned on a first end of the lamp case;
   a light guide plate positioned at an inside the lamp case; and
   a cover coupled to the lamp case and configured to cover the light guide plate.

4. The refrigerator of claim 3, wherein:
   the LED substrate includes a plurality of light emitting diodes (LEDs), and
   the plurality of LEDs are positioned to overlap with a lateral surface of the light guide plate.

5. The refrigerator of claim 3, wherein one of the pair of lighting assemblies is positioned along a vertical direction of the storage compartment.

6. The refrigerator of claim 3, wherein the light guide plate is positioned to face the first and second lateral surfaces of the case.

7. The refrigerator of claim 3, wherein:
the light guide plate includes a lower pattern provided in a lower region of the light guide plate, and
a density of the lower pattern increases in a direction moving farther from the LED substrate.

8. The refrigerator of claim 3, wherein:
the light guide plate includes an upper pattern provided in an upper region of the light guide plate, and
the upper pattern is extended along a vertical direction of the storage compartment.

9. The refrigerator of claim 3, wherein: the cover includes a diffusion plate provided on an upper surface of the cover.

10. The refrigerator of claim 3, wherein:
a hook protrusion protrudes from a second end of the lamp case and toward the inside of the lamp case, and
an end of the light guide plate is fixed to a lower section of the hook protrusion.

11. The refrigerator of claim 3, wherein:
the cover includes a first lateral surface extension and a second lateral surface extension, which are extended from respective lateral surfaces of cover in a direction toward the light guide plate, and
the first lateral surface extension and the second lateral surface extension are configured to contact an upper edge area of the lamp case and an upper edge area of the light guide plate.

12. The refrigerator of claim 11, wherein:
the cover includes a plurality of hook coupling recesses formed in a lateral surface of the cover,
the lamp case includes a plurality of hooks provided in a lateral surface of the lamp case, and
the plurality of hooks are coupled to the plurality of coupling recesses, respectively, to secure the lamp case and the cover together.

13. The refrigerator of claim 1, further comprising:
a plurality of fixing bosses provided on a rear surface of the cold air supply duct;
a plurality of fastening through-holes provided on a rear surface of the case, corresponding to the plurality of fixing bosses; and
a plurality of fastening bushings fastened to the plurality of fixing bosses through the plurality of fastening through-holes.

14. The refrigerator of claim 1, wherein:
the case defines a refrigeration compartment and a freezer compartment, and
the cold air supply duct is provided in the refrigeration compartment.

15. The refrigerator of claim 14, wherein:
the cold air supply duct further includes a lower end that is coupled to a connection duct, and
the refrigerator further includes a grill fan assembly provided in the freezer compartment and configured to blow cold air generated by an evaporator to the connection duct.

16. The refrigerator of claim 14, wherein:
a refrigerator compartment cold air main outlet hole is formed in an upper area of the cold air supply duct, and
a refrigerator compartment cold air auxiliary outlet guide is provided in a lower area of the refrigerator compartment cold air main outlet hole.

17. The refrigerator of claim 1, wherein a front surface of the cold air supply duct covers the pair of lighting assemblies in a front-to-back direction.

18. A refrigerator comprising:
a case defining a storage compartment;
a door to open and close the storage compartment; and
a duct positioned at a rear surface of the case, and spaced apart from a lateral surface of the case,
wherein:
the duct includes a lighting device positioned along a rear surface of the duct and configured to output light toward the lateral surface of the case,
the lateral surface of the case has a curved surface to reflect light, and
the curved surface includes regions having different curvatures.

19. A refrigerator comprising:
a case defining a storage compartment;
a door to open and close the storage compartment; and
a duct positioned at a rear surface of the case, and spaced apart from a lateral surface of the case,
wherein:
the duct includes a lighting device positioned and configured to output light toward the lateral surface of the case,
the light device includes:
a lamp case;
a substrate positioned on a first end of the lamp case;
at least one light emitting diode (LED) provided on the substrate;
a light guide plate positioned inside the lamp case to receive light from the LED and to direct light toward the lateral surface of the case; and
a cover coupled to the lamp case and configured to cover the light guide plate, and
the lateral surface of the case has a curved surface, and the curved surface includes regions having different curvatures.

* * * * *